United States Patent
Wang

(10) Patent No.: US 10,769,105 B2
(45) Date of Patent: Sep. 8, 2020

(54) MODIFYING LUCENE INDEX FILE

(71) Applicant: ZHEJIANG UNIVIEW TECHNOLOGIES CO., LTD, Hangzhou (CN)

(72) Inventor: Xincheng Wang, Hangzhou (CN)

(73) Assignee: ZHEJIANG UNIVIEW TECHNOLOGIES CO., LTD., Hangzhou (CN)

( * ) Notice: Subject to any disclaimer, the term of this patent is extended or adjusted under 35 U.S.C. 154(b) by 907 days.

(21) Appl. No.: 15/119,841

(22) PCT Filed: Dec. 25, 2015

(86) PCT No.: PCT/CN2015/098939
§ 371 (c)(1),
(2) Date: Aug. 18, 2016

(87) PCT Pub. No.: WO2016/101915
PCT Pub. Date: Jun. 30, 2016

(65) Prior Publication Data
US 2017/0068681 A1  Mar. 9, 2017

(30) Foreign Application Priority Data

Dec. 26, 2014 (CN) .......................... 2014 1 0830430

(51) Int. Cl.
*G06F 16/13* (2019.01)
*G06F 16/22* (2019.01)

(52) U.S. Cl.
CPC .......... *G06F 16/13* (2019.01); *G06F 16/2272* (2019.01)

(58) Field of Classification Search
CPC ............... G06F 16/951; G06F 16/2228; G06F 16/9535; G06F 16/13; G06F 16/319; G06F 16/31
See application file for complete search history.

(56) References Cited

U.S. PATENT DOCUMENTS 7,865,509 B2    1/2011  Barsness et al.
2008/0059418 A1  3/2008  Barsness et al.
(Continued)

FOREIGN PATENT DOCUMENTS

CN     101004737 A    7/2007
CN     102033948 A    4/2011
(Continued)

OTHER PUBLICATIONS

Ricky Ho "Text Processing, Part 2: Oh, Inverted Index-Dzone Big data", Feb. 26, 2013.*
(Continued)

*Primary Examiner* — Apu M Mofiz
*Assistant Examiner* — Cindy Nguyen
(74) *Attorney, Agent, or Firm* — McCoy Russell LLP

(57) ABSTRACT

A method and a device for modifying a Lucene index file are disclosed. After acquiring a target field to be modified, an old term to be modified under the target field and a new term for replacing the old term, every segment in an index folder may be firstly traversed to generate corresponding information of the new term according to corresponding information of the old term and generate a new index file of the segment based on information under other fields of the segment and corresponding information of the new term and corresponding information of other terms under the target field of the segment. Then a corresponding original index file in the index folder is replaced with the new index file, thereby achieving the modification of a specific term under a certain field in the Lucene index file.

11 Claims, 6 Drawing Sheets

(56) References Cited

U.S. PATENT DOCUMENTS

| | | | |
|---|---|---|---|
| 2009/0037372 A1 | 2/2009 | Barsness et al. | |
| 2009/0193406 A1* | 7/2009 | Williams | G06F 16/951 717/168 |
| 2012/0317105 A1* | 12/2012 | Bai | G06F 16/3334 707/728 |
| 2014/0101167 A1* | 4/2014 | Qin | G06F 16/316 707/742 |

FOREIGN PATENT DOCUMENTS

| | | |
|---|---|---|
| CN | 103885975 A | 6/2014 |
| CN | 104462558 A | 3/2015 |

OTHER PUBLICATIONS

ISA State Intellectual Property Office of the People's Republic of China, International Search Report Issued in Application No. PCT/CN2015/098939, dated Mar. 31, 2016, WIPO, 4 pages.

* cited by examiner

MODIFYING LUCENE INDEX FILE

CROSS-REFERENCE TO RELATED APPLICATIONS

The present application is a U.S. National Phase of International Patent Application No. PCT/CN2015/098939, entitled "MODIFYING LUCENE INDEX FILE," filed on Dec. 25, 2015, which claims priority to Chinese Patent Application No. 201410830430.6, entitled "MODIFYING LUCENE INDEX FILE," filed on Dec. 26, 2014, the entire contents of each of which are hereby incorporated by reference for all purposes.

BACKGROUND

The present disclosure belongs to a technical field of database index, in particular relates to a method and a device for modifying a Lucene index file.

Vehicle information management is one of important functions of a traffic management system, and a database of the system needs to save information of a vehicle passing a plurality of crossroads, such as time, a place, a speed, a vehicle model, a picture, and alarm information. As the database becomes larger and larger and the requirement for a search speed is higher and higher, a search engine such as Lucene is usually needed to recreate the index of data in the database. In this way, a query function of the system still can achieve an ideal response speed even if the quantity of the information saved in the database reaches the level of 1 billion.

However, for objective or subjective reasons, there are potential errors in the information of the database. For example, a community originally affiliated with a certain administrative district is likely to be mistakenly set as a community of other administrative districts by an operator. This kind of information error existing during an index creation is reflected in a Lucene index file, which will lead to an error in a certain field.

The Lucene provides three kinds of operation modes, namely, addition, deletion and modification, to correct the above field error. The operation "addition" is used for adding a document to an existing index folder; the operation "deletion" is used for deleting a document conforming to a specific condition from the index folder; and the operation "modification" is substantially a combination of the operations "addition" and "deletion", namely, deleting a wrong document from the index folder and adding a right document to the index folder. Thus it can be seen that, the operation "modification" of Lucene does not mean that contents of the index folder can be directly modified, but for partial data with information errors, right data is reacquired from the database to recreate a right index.

However, the creation of index is an extraordinarily time-consuming process. For example, it will take a few days to create indexes of level of 1 billion under a cluster. Therefore, the above operation "modification" becomes quite intolerable in commercial applications.

DETAILED DESCRIPTION

The technical solution of the present disclosure will be described in detail below in combination with drawings and embodiments but the following embodiments do not limit the present disclosure.

Taking Lucene 4.x as an example, a structure of Lucene index file from up to down may comprise following several levels:

1) Index: an actual operation object of the Lucene to realize an index creation function, a mergence function and a search function. All of index files may be stored in the same folder.

2) Segment: an existing form of the index file. One segment may comprise a plurality of index files, and index files in the same segment have the same segment name and different postfixes. Segments are independent from each other.

3) Document: a basic unit of index creation. One document is an index record and the recorded content is specific information of the index.

4) Field: an information organization unit of a document. One document may include a plurality of fields, such as a title, an author, an abstract, a body and publication time. The index may be more scientifically and reasonably processed by organizing information of the document in a form of fields.

5) Term: a basic unit of index information. One field may include a plurality of terms.

For example, an index record of the traffic management system may include information, such as a license plate number, passing time of vehicle, a vehicle body color, a vehicle logo and an organizational relation. This index record is the above-mentioned document. The license plate number, the passing time of vehicle, the vehicle body color and the like are the fields. The specific contents of filed, such as the vehicle body colors of "red, blue and black", are the terms. A plurality of similar index records may constitute one segment and a set of all segments is the index.

Figure 1A:
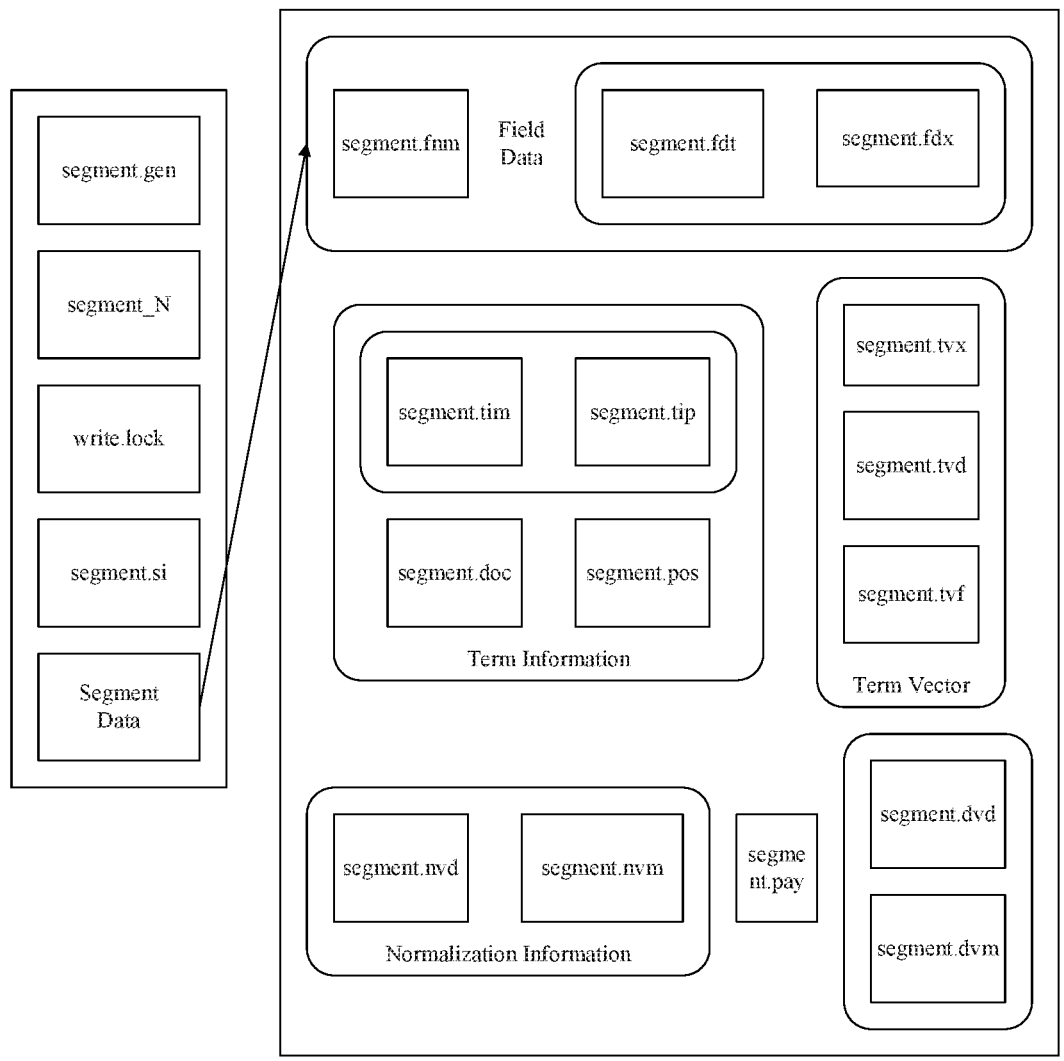
FIG. 1A is an organizational distribution diagram of a Lucene index file.

FIG. 1A shows an organizational distribution diagram of a Lucene index file. It can be seen from the figure that, every segment is comprised of a plurality of index files and these index files may be divided into forward information saving files and reverse information saving files.

Wherein the forward information refers to information according to the from-up-to-down structure (for example, index→segment→document→field→term) of the index. The forward information saving files in FIG. 1 may comprise:

segment_N and segment.gen for saving the quantity and names of all segments and the document quantity in each segment, wherein these two files do not belong to a certain specific segment;

segment.si for saving metadata of segment;

segment.fnm for saving fields contained in a segment, types of fields and a indexed mode;

segment.fdx and segment.fdt for saving information of fields, including the quantity of terms contained in each field;

segment.dvd and segment.dvm for coding additional scoring factors and other preset documents; and segment.pay, segment.nvd, segment.nvm and the like for saving related forward information, wherein these files generally will not be generated.

On the other hand, the reverse information, also called inverted index information, generally refers to a mapping from the term to the index. The reverse information saving files (also called inverted index files below) in FIG. 1A may comprise:

segment.tim and segment.tip for saving term information under every field which is usually sorted from small to large in a lexicographic order;

segment.doc for saving a document number (DocID) and an occurrence frequency (DocFreq) corresponding to each term; and segment.pos for saving location information of every term in each document.

According to an aspect of the present disclosure, a method for modifying a specific term under a certain field in a Lucene index file is provided, wherein a index file including term information, for example an inverted index file such as segment.tim, segment.tip, segment.doc, segment.pos and the like, needs to be modified. In general, these inverted index files will influence each other and the change of one of them means that the others also need to be adjusted. Therefore, the modification purpose can not be realized only by replacement of local information, but a new index file may need to be generated with related information according to the existing file format.

Figure 1B:
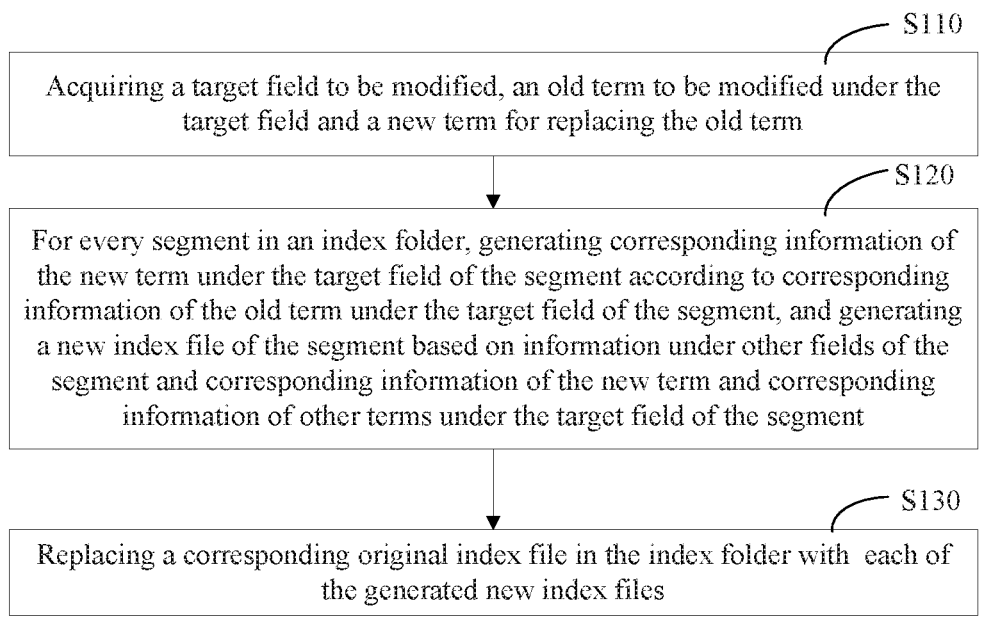
FIG. 1B is a flow chart of a method for modifying the Lucene index file provided according to an example of the present disclosure.

As shown in FIG. 1B, the method may comprise: acquiring a target field to be modified, an old term to be modified under the target field and a new term for replacing the old term (step S110); then for every segment in an index folder, generating corresponding information of the new term under the target field of the segment according to corresponding information of the old term under the target field of the segment, and generating a new index file of the segment based on information under other fields of the segment, and the corresponding information of the new term and corresponding information of other terms under the target field of the segment (step S120), wherein the other fields comprise all fields except the target field under the segment, and the other terms comprise all terms except the new term and the old term under the target field; and finally replacing a corresponding original index file in the index folder with the generated new index file (step S130).

Wherein the new index file may comprise the inverted index file including term information in the Lucene index file, such as segment.tim, segment.tip, segment.doc, segment.pos and the like. The corresponding information may comprise term-related information, such as the DocID (representing the documents where a term occurs) and the occurrence frequency DocFreq of term.

By generating corresponding information of the new term based on corresponding information of the old term in the original index file, and generating a new index file based on the generated corresponding information of the new term and corresponding information of all the other terms except the old term in the original index file, the above-mentioned method may complete the modification of a certain term under a specific field on the premise of conforming to an existing format of index file.

Figure 2:
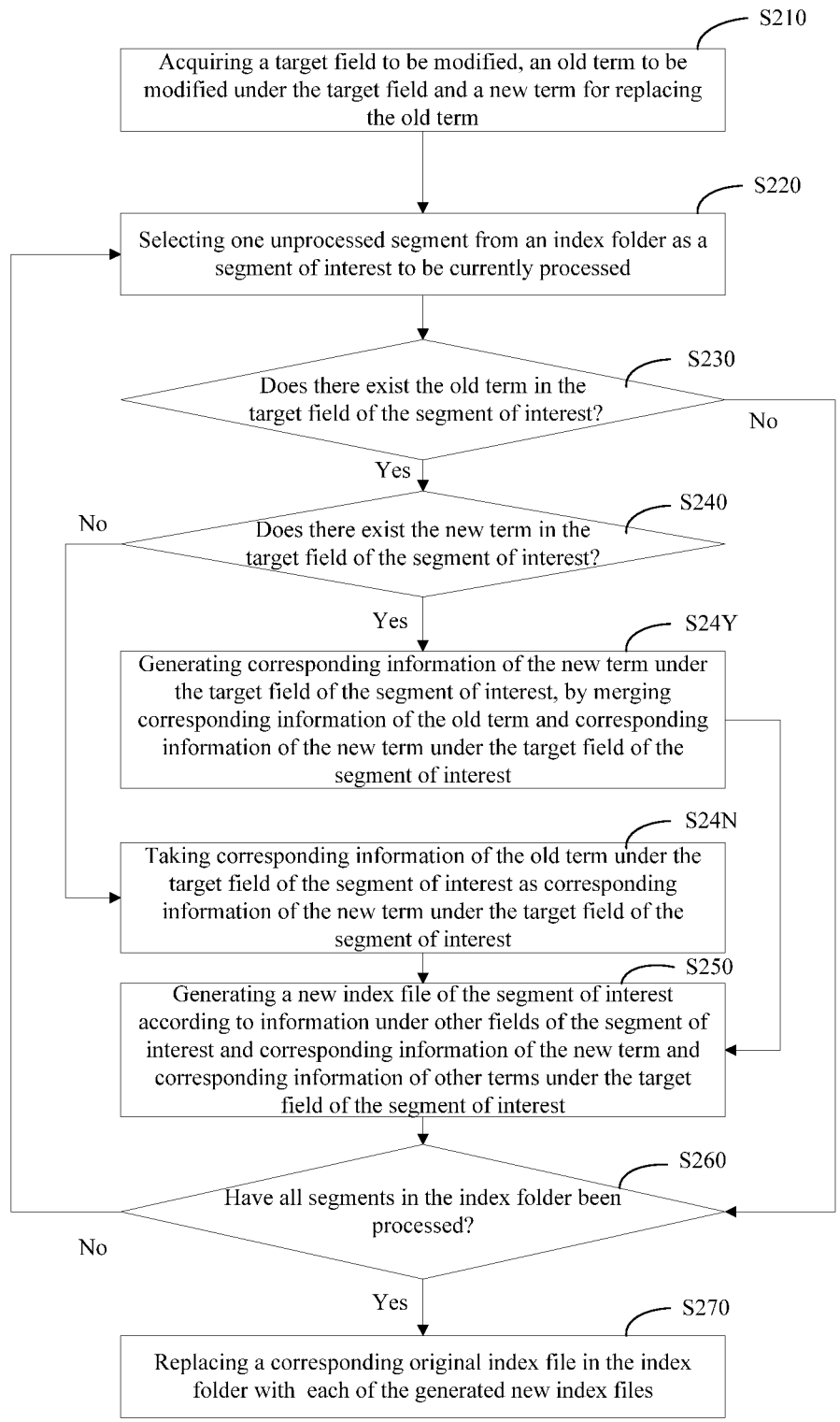
FIG. 2 is a flow chart of a method for modifying the Lucene index file provided according to another example of the present disclosure.

FIG. 2 shows a flow chart of a method for modifying the Lucene index file according to another example of the present disclosure. As shown in FIG. 2, the method may comprise following steps.

At the step S210, a target field to be modified, an old term to be modified under the target field and a new term for replacing the old term may be acquired.

For example, the possibly existing fields in the database of traffic management system may include time, a place, a speed, a vehicle model, a license plate number, a vehicle body color and the like. Assuming that there exists an information error in a certain place, for example the term "the intersection of Wensan Road" is mistakenly inputted as "the intersection of Moganshan", the acquired parameters used for a modification process may comprise: the field—a place; the old term—the intersection of Moganshan; and the new term—the intersection of Wensan Road.

At the step S220, one unprocessed segment may be selected from an index folder as a segment of interest to be currently processed.

For example, information of all segments may be read from files of segment_N and segment.gen, including the quantity and the names of segments, and a modification process may be performed on each segment based on the information. In addition, segments are independent from each other, therefore multithreading may be adopted to implement the modification processes of a plurality of segments in parallel, thereby reducing time necessary for modifying the whole index folder.

Hereinafter, the modifying process for one segment of interest will be described in S230-S250.

At the step S230, it is judged whether there exists the old term in the target field of the segment of interest or not, and if YES, the process enters the step S240, otherwise it is considered that the segment of interest is unnecessary to be modified and the process may enter the subsequent step S260.

At the step S240, it is judged whether there exists the new term in the target field of the segment of interest or not, and if YES, the process enters the step S24Y, otherwise the process enters the step S24N.

At the step S24Y, there exist both of the old term and the new term in the target field of the segment of interest, in this case, new corresponding information of the new term under the target field of the segment of interest may be generated by merging corresponding information of the old term and corresponding information of the new term under the target field of the segment of interest.

For example, assuming that the old term is A and the new term is C, if there exist the old term A and the new term C in the target field of the segment of interest, the old term A and the new term C may be regarded as the same term to reorganize related information in the segment of interest. For example, a union set of the DocIDs corresponding to the two terms is used as the DocID corresponding to a new term, and a sum of the occurrence frequencies of the two terms is used as the occurrence frequency of the new term, thereby generating new corresponding information of the new term. In the Lucene index file, the DocID and the DocFreq are usually stored according to established rules, such as a storage from small to large or an incremental storage.

At the step S24N, there exists the old term but no the new term in the target field of the segment of interest, in this case, corresponding information of the new term under the target field of the segment of interest may be generated according to corresponding information of the old term under the target field of the segment of interest. For example, the corresponding information of the old term which may comprise the DocID, the DocFreq and the like, is given directly to the new term to generate the corresponding information of the new term under the target field of the segment of interest.

At the step S250, after obtaining the corresponding information of the new term under the target field of the segment of interest by the step S24Y or S24N, a new index file of the segment of interest may be generated according to information under other fields of the segment of interest and the corresponding information of the new term and corresponding information of other terms under the target field of the segment of interest.

Wherein the other fields comprise all fields except the target field under the segment. The other terms comprise all terms except the old term and the new term under the target field. The corresponding information may comprise term-related information, such as the DocID (representing the documents where a term occurs) and the occurrence frequency DocFreq of the term. The new index file may comprise the inverted index file including term information in the Lucene index file, such as segment.tim, segment.tip, segment.doc, segment.pos and the like.

Figure 3:
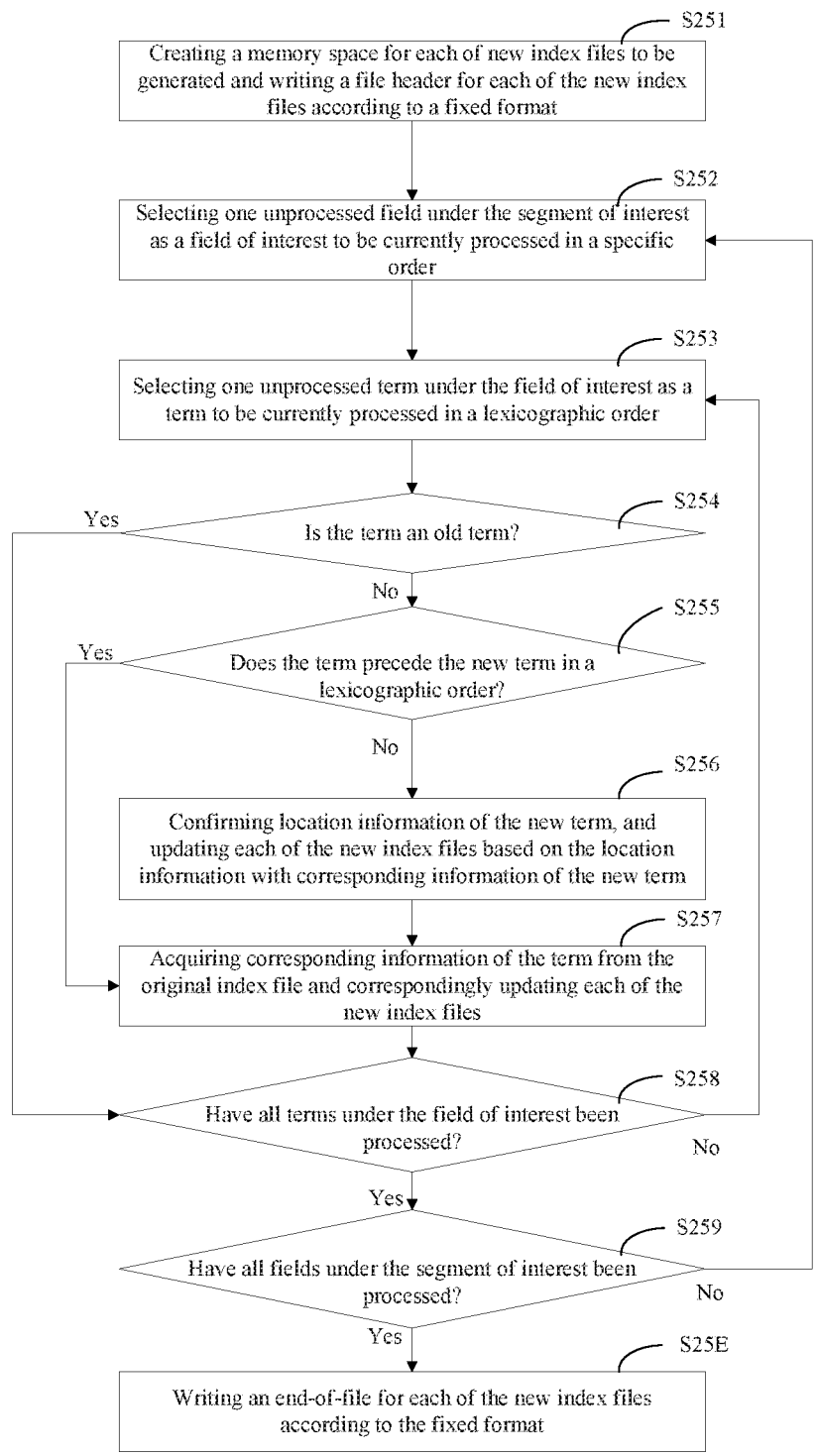
FIG. 3 is a flow chart of a method for generating a new Lucene index file provided according to an example of the present disclosure.

As described above, the change of a certain term may cause the structural change of the related module in the original index file, such as an adjustment of sorting order. Therefore, the purpose for modifying a certain term in the Lucene index file can not be realized only by replacement of local information, but a new index file may need to be generated with related information according to the existing file format. FIG. 3 shows a flow chart of a method for generating a new index file under the currently processed segment of interest provided according to an example of the present disclosure. As shown in FIG. 3, the step S250 in FIG. 2 may comprise following steps.

At the step S251, a memory space is created for each of new index files to be generated and a file header for each of the new index files is written according to a fixed format. Wherein the new index file may comprise the inverted index file including term information in the Lucene index file, such as segment.tim, segment.tip, segment.doc, segment.pos and the like.

At the step S252, one unprocessed field under the segment of interest may be selected as a field of interest to be currently processed according to a specific order.

Wherein the specific order may be a field order of the segment of interest. For example, after processing all terms under one field, the next field will be processed until all fields under the segment of interest are processed.

At the step S253, one unprocessed term under the field of interest may be selected as a term to be currently processed in a lexicographic order.

At the step S254, it is judged whether the term is an old term or not.

If the term is the old term, the term may be skipped, for example, the process enters the step S258, and this is because corresponding information of the old term is or will be given to a new term so that it is unnecessary to write information of the old term in the new index file.

If the term is not the old term, related information may be written in the new index file according to a lexicographic order relation between the term and a new term, for example, the process enters the step S255.

At the step 255, it is judged whether the term precedes the new term in a lexicographic order or not.

Generally, all terms under every field may be sorted in a lexicographic order and stored in an index file in the form of termBlock. For example, the basic unit of the index file segment.tim is termBlock and the index file segment.tip may store the length and the prefix as well as the location information of each termBlock in the index file segment.tim. By giving a processing priority to the term preceding others in a lexicographic order, it may be ensured that related information, such as the DocID, the DocFreq and a corresponding termBlock, will be written in a corresponding new index file after finding the accurate location where each term should be in the file.

At the step S256, if the judgment result in the step S255 is NO, that is, the term follows the new term, it may be considered that the location information of the new term has been found, and each of the new index files may be updated based on the location information with corresponding information of the new term.

For example, corresponding information of the new term (including the DocID, the DocFreq and the like) and the location information are written in files, such as segment.doc and segment.pos, and the correspondingly generated termBlock is written in files, such as segment.tim and segment.tip.

According to an example, for example, the termBlock may be generated according to a finite state transducer (FST). Wherein the FST, as a kind of data structure, may have characteristics of small space usage and high query speed by repeatedly utilizing a prefix and a suffix of word in a dictionary. The detailed description of FST may refer to documents related to Lucene, which will not be redundantly explained herein.

At the step S257, if the judgment result in the step S255 is YES, that is, the term precedes the new term, or if the process of the step S256 has been completed in a case where the judgment result in the step S255 is NO, that is, after the new term preceding the term has been processed, corresponding information of the term may be acquired from the original index file and each of the new index files may be correspondingly updated.

For example, the corresponding information of the term (including the DocID, the DocFreq and the like) and the location information are written in files, such as segment.doc and segment.pos, and the termBlock generated according to the FST is written in files such as segment.tim and segment.tip.

At the step S258, after a process for one term has been completed, it is judged whether all terms under the field of interest have been processed or not. If YES, it may be considered that a process for the field of interest has been completed and the process enters the step S259, otherwise the process returns to the step S253 to continue to process the next term under the field of interest in a lexicographic order.

At the step S259, after a process for one field has been completed, it is judged whether all fields under the segment of interest have been processed. If YES, it may be considered that a process for the segment of interest has been completed and the process enters the step S25E, otherwise the process returns to the step S252 to continue to process the next field under the segment of interest.

At the step S25E, after all terms under each field of the segment of interest have been processed, an end-of-file for each of the new index files may be written according to the fixed format, thereby obtaining a complete file conforming to a index format.

So far, a modifying process for one segment of interest has been completed, and then the step S260 may be entered to judge whether all segments in the index folder have been processed or not. If YES, the process enters the step S270, otherwise returns to the step S220.

At the step S270, after confirming that all segments in the index folder have been processed, each of the generated new index files may be used for replacing a corresponding original index file in the index folder. In this way, it may be ensured that the original file will not be damaged even if the modification fails halfway, thereby effectively protecting the original data, which means that it is unnecessary to stop an index creation and a query work, during modifying a specific term under a certain field in the Lucene index file according to the solution of the present disclosure.

Figure 4:
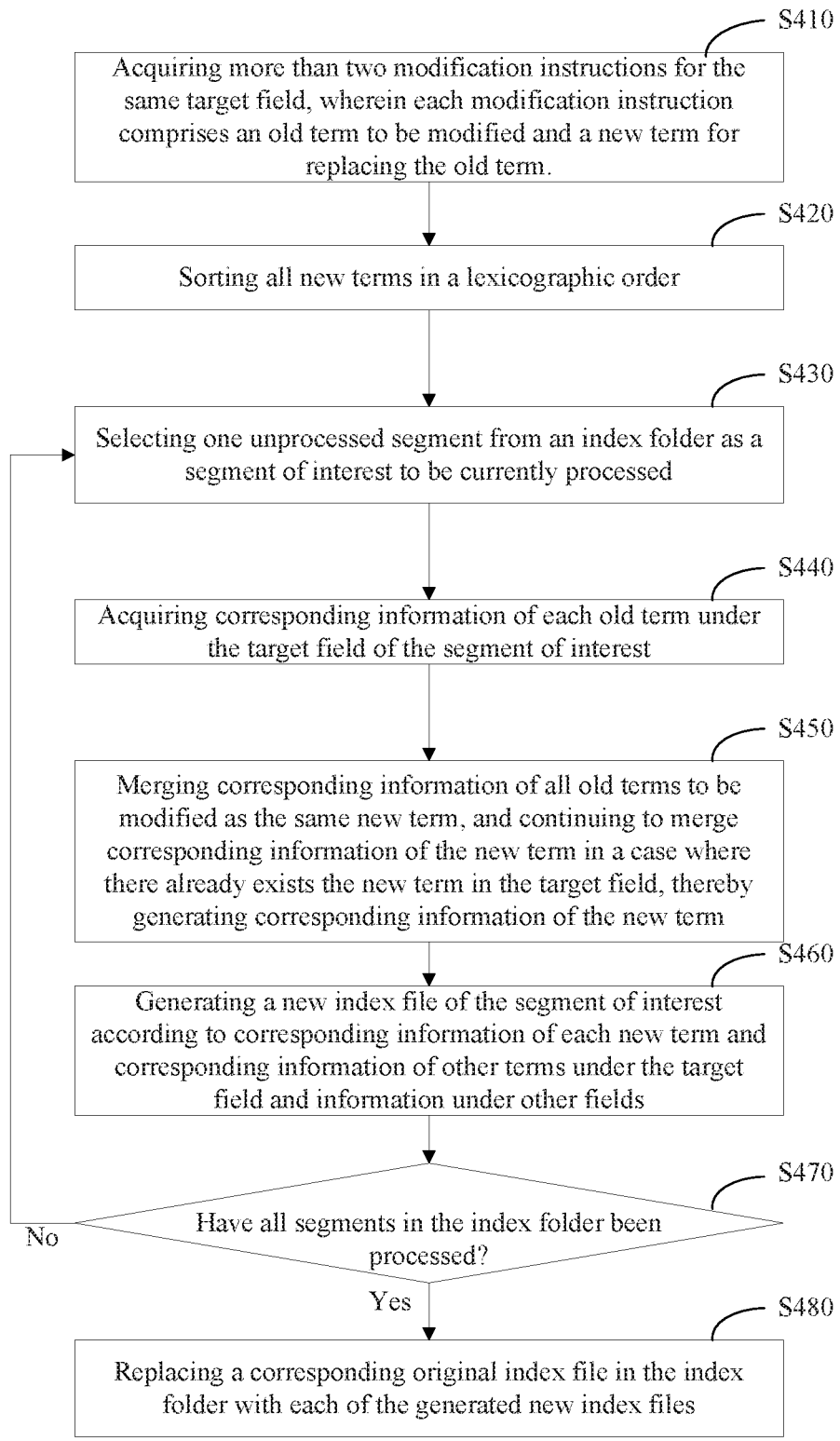
FIG. 4 is a flow chart of a method for batch modifying terms in the Lucene index file provided according to an example of the present disclosure.

In a case of a plurality of terms to be modified, the modification may be completed by implementing the above method for many times. For example, terms may be processed one by one by looping execution of the above method, until all terms to be modified are processed. However, if the quantity of the terms to be modified is relatively large, such as a level of 1 billion, it will take a relatively long time to complete the modification by the above method, which is even likely to be intolerable. For this, according to another aspect of the present disclosure, a method for batch modifying terms in the Lucene index file is provided. As shown in FIG. 4, the method may comprise following steps.

At the step S410, more than two modification instructions for the same target field are acquired, wherein each modification instruction comprises an old term to be modified and a new term for replacing the old term.

At the step S420, all new terms under the same target field are sorted in a lexicographic order. Thus subsequent processing time may be saved because of conforming to an existing format of index file.

At the step S430, one unprocessed segment may be selected from an index folder as a segment of interest to be currently processed.

For example, information of all segments may be read from of files of segment_N and segment.gen, including the quantity and the names of segments, and a modification process may be performed on each segment based on the information. In addition, segments are independent from each other, therefore multithreading may be adopted to implement the modification processes of a plurality of segments in parallel, thereby reducing time necessary for modifying the whole index folder.

At the step S440, corresponding information of each old term under the target field of the segment of interest is acquired.

At the step S450, corresponding information of all old terms to be modified as the same new term is merged, and corresponding information of the new term is continued to merge in a case where there already exists the new term in the target field, thereby generating new corresponding information of the new term under the target field.

According to practical application scenarios, a case where a plurality of old terms need to be modified as the same new term may occur. In this case, corresponding information of each of all old terms to be modified as the same new term may be merged. For example, in a case where an old term A needs to be modified as a new term C and an old term B also needs to be modified as the new term C, corresponding information of the old term A and corresponding information of the old term B may be merged to generate corresponding information of the new term C. Wherein the mergence method may be similar to the above method for merging corresponding information of the new term and corresponding information of the old term, which will not be redundantly explained herein.

In addition, a case where there exist both of the old term and the new term in the target field of the segment of interest may also occur. In this case, corresponding information of the old term and corresponding information of the new term may be merged. For example, in a case where the old term A needs to be modified as the new term C, the old term B also needs to be modified as the new term C and there already exists the new term C in the target field of the segment of interest, corresponding information of the old term A, corresponding information of the old term B and corresponding information of the new term C may be merged to generate new corresponding information of the new term C.

At the step S460, a new index file of the segment of interest may be generated according to corresponding information of each new term and corresponding information of other terms under the target field, and information under other fields. Wherein the other fields comprise all fields except the target field under the segment of interest, and the other terms comprise all terms except all old terms and all new terms under the target field.

Because the change of term may cause the structural change of the related module in the index file, similar to the above-mentioned step S250, the step S460 is used for generating a new index file rather than directly modifying the index file. Furthermore, at the step S460, the specific implement method for generating a new index file with related information according to the existing file format, may also be as shown in FIG. 3, which will not be redundantly explained herein.

So far, a modifying process for one segment of interest has been completed, and then the step S470 may be entered to judge whether all segments in the index folder have been processed or not. If YES, the process enters the step S480, otherwise returns to the step S430.

At the step S480, after confirming that all segments in the index folder have been processed, each of the generated new index files may be used to replace a corresponding original index file in the index folder. In this way, it may be ensured that the original file will not be damaged even if the modification fails halfway, thereby effectively protecting the original data.

In general, in practical applications, segments in an index folder may be merged. For example, a plurality of small segments are merged into one large segment and then the original small segments are deleted, which will lead to the change in the name of segment, thereby bringing troubles to the modification of index file. For example, when the modification for a certain segment is completed, this segment is likely to have been merged into a new segment and does not exist in the index folder. For this, a mergence strategy may be modified, so that the segments to be modified will not be merged during the modification, and will be allowed to participate in the mergence after completing the modification.

According to an example, before starting to modify a certain index folder, for example, before the step S210 or S410, information of all segments under the index folder may be acquired, and the mergence strategy may be modified based on the acquired information, so that a segment associated with the acquired information can not participate in the mergence. Then, the modification of the term under the index folder may be completed with reference to FIG. 2 or FIG. 4, and after the modification, the mergence strategy may be remodified based on the acquired information, so that the segment associated with the acquired information can participate in the mergence.

According to an example, after acquiring information of all segments under the index folder, the acquired information may be saved in a file, such as info.txt. Furthermore, after remodifying the mergence strategy based on the acquired information, the file may be deleted.

Figure 5:
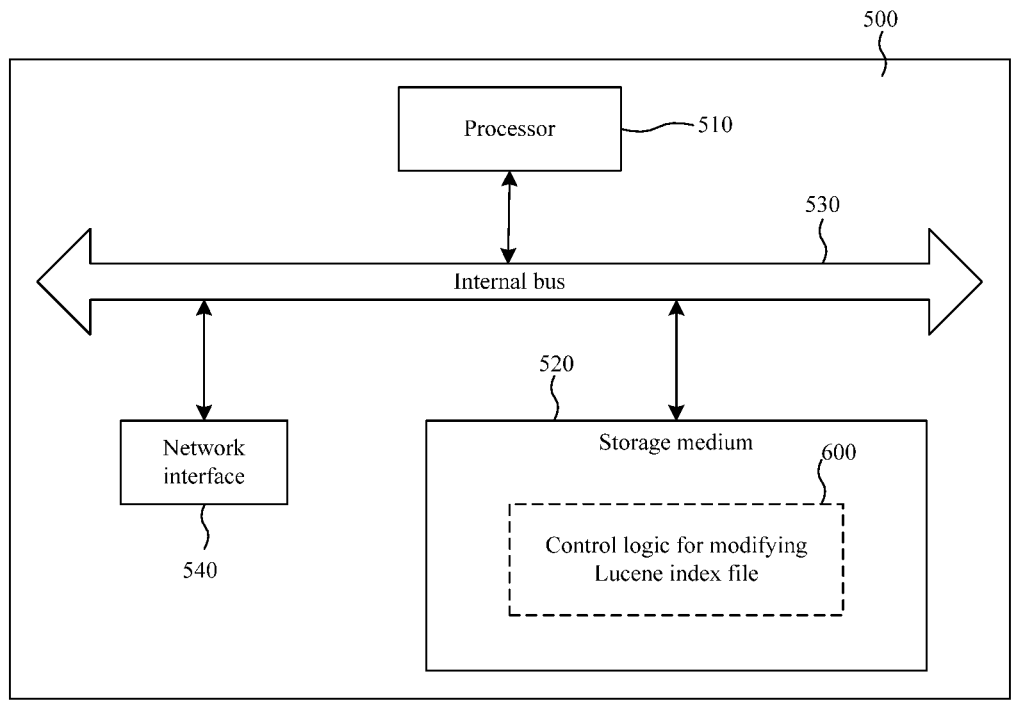
FIG. 5 is a hardware structure diagram of a device for modifying the Lucene index file provided according to an example of the present disclosure.

According to yet another aspect of the present disclosure, a device for modifying a Lucene index file is provided. As shown in FIG. 5, the device 500 may comprise a processor 510 such as CPU, and a machine readable storage medium 520. Wherein the processor 510 and the machine readable storage medium 520 are usually interconnected via an internal bus 530. In other possible implementations, the device 500 may further comprise a network interface 540 to enable communication with other external devices or external components.

The machine readable storage medium 520 may be a random access memory (RAM), a volatile memory, a non-volatile memory, a flash memory, a storage driver (such as a hard disk drive), a solid state disk, any type of storage disks (such as an optical disk and a DVD etc.) or a similar storage medium or the a combination thereof.

Further, the machine readable storage medium 520 may store a control logic 600 for modifying a Lucene index file. From a perspective of functional division, the control logic 600 may comprise:

a modification instruction acquiring module 610 used for acquiring a modification instruction, wherein the modification instruction may comprise a target field to be modified, an old term to be modified under the target field and a new term for replacing the old term;

an index file generating module 620 used for traversing every segment in an index folder to generate corresponding information of the new term under the target field of the segment according to corresponding information of the old term under the target field of the segment, and generate a new index file of the segment based on information under other fields of the segment, and corresponding information of other terms and corresponding information of the new term under the target field of the segment, wherein the other fields comprise all fields except the target field under the segment, the other terms comprise all terms except the new term and the old term under the target field, the corresponding information may comprise the DocID, the DocFreq and the like and the new index file may comprise an inverted index file including term information in the Lucene index file, such as segment.tim, segment.tip, segment.doc and segment.pos; and an index file replacing module 630 used for replacing a corresponding original index file in the index folder with the new index file.

Figure 6:
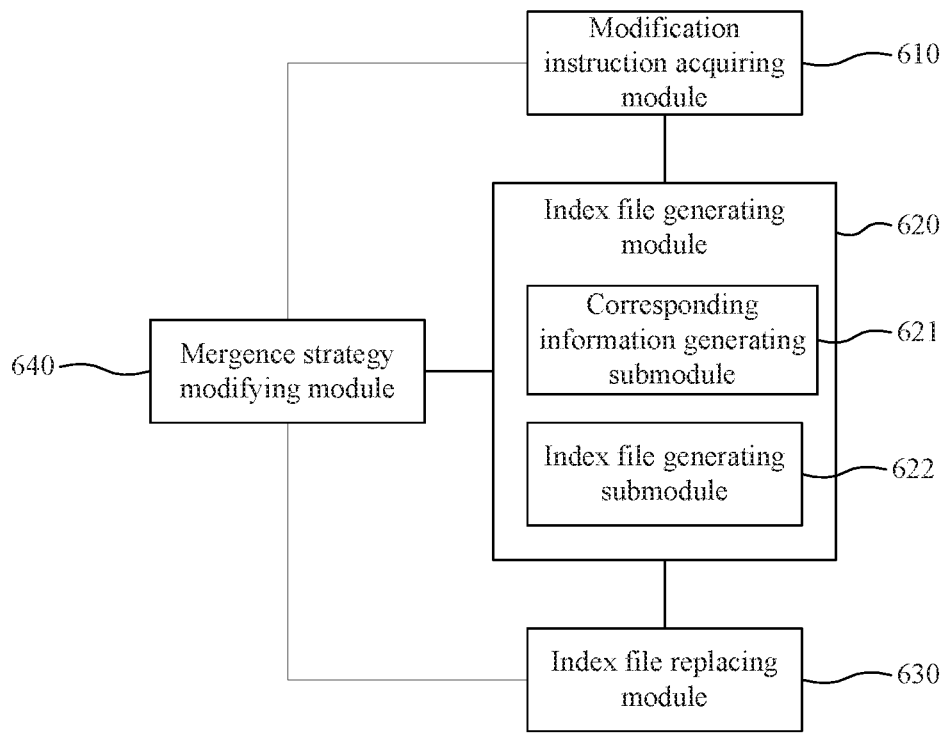
FIG. 6 is a block diagram of functional modules of a control logic for modifying the Lucene index file provided according to an example of the present disclosure.

According to an example, as shown in FIG. 6, the index file generating module 620 may comprise a corresponding information generating submodule 621 used for:

merging the corresponding information of the old term and the corresponding information of the new term under the target field of the segment and taking the merged information as the corresponding information of the new term under the target field of the segment, in a case where there exist both of the old term and the new term in the target field of the currently processed segment;

taking the corresponding information of the old term under the target field of the segment as the corresponding information of the new term under the target field of the segment, in a case where there exists the old term but no the new term in the target field of the segment; and ending a process for the segment in a case where there exists no the old term in the target field of the segment.

According to an example, the corresponding information generating submodule 621 may also be used for: merging corresponding information of each of all old terms to be modified as the same new term.

According to an example, the index file generating module 620 may further comprise an index file generating submodule 622 used for:

creating a memory space for the new index file to be generated, and writing a file header for the new index file according to a fixed format;

updating the new index file according to corresponding information of the other terms and corresponding information of the new term under the target field and information under the other fields, by traversing every field under the segment and traversing every term under every field in a lexicographic order;

writing an end-of-file for the new index file according to the fixed format, after processing all terms under all fields of the segment.

Wherein the index file generating submodule 622 may further comprise an information writing unit used for:

in a case where a currently processed field is not the target field, writing corresponding information of all terms under the field in the new index file;

in a case where the field is the target field and a currently processed term under the field is the old term, ending a process for the term;

in a case where the field is the target field but the currently processed term is not the old term and precedes the new term in the lexicographic order, writing corresponding information of the currently processed term in the new index file; and in a case where the field is the target field but the currently processed term is not the old term and follows the new term in the lexicographic order, confirming location information of the new term and after writing the corresponding information of the new term in the new index file, writing corresponding information of the currently processed term in the new index file.

Further, the index file generating submodule 622 may further be used for: sorting all new terms under the same target field in the lexicographic order before traversing every field under the segment.

According to an example, the control logic 600 may further comprise a mergence strategy modifying module 640 used for:

acquiring information of all segments under the index folder and modifying a mergence strategy based on the acquired information to disable the segment associated with the acquired information to participate in the mergence, before the index file generating module 620 traverses every segment in the index folder; and remodifying the mergence strategy based on the acquired information to enable the segment associated with the acquired information to participate in the mergence, after an index file replacing module 630 replaces a corresponding original index file in the index folder with the new index file.

A software implementation will be described below as an example to further illustrate how the device for modifying the Lucene index file executes the control logic 600. In the example, the control logic 600 should be understood as the machine executable instructions stored in the machine readable storage medium 520. By invoking the machine executable instructions corresponding to the control logic 600 stored in the machine readable storage medium 520, the processor 510 may execute following operations:

acquiring a target field to be modified, an old term to be modified under the target field and a new term for replacing the old term;

traversing every segment in an index folder to generate corresponding information of the new term under the target field of the segment according to corresponding information of the old term under the target field of the segment, and generate a new index file of the segment based on information under other fields of the segment, and corresponding information of other terms and corresponding information of the new term under the target field of the segment; and replacing a corresponding original index file in the index folder with the new index file after processing all segments.

Wherein the other fields comprise all fields except the target field under the segment, the other terms comprise all terms except the new term and the old term under the target field, the corresponding information of old term of new term may comprise term-related information, such as the DocID, the DocFreq and the like. The new index file may comprise an inverted index file including term information in the Lucene index file, such as segment.tim, segment.tip, segment.doc and segment.pos.

According to an example, when generating the corresponding information of the new term under the target field of the segment according to the corresponding information of the old term under the target field of the segment, the machine executable instructions may cause the processor to execute the following operations:

merging the corresponding information of the old term and the corresponding information of the new term under the target field of the segment and taking the merged information as the corresponding information of the new term under the target field of the segment, in a case where there exist both of the old term and the new term in the target field of the segment;

taking the corresponding information of the old term under the target field of the segment as the corresponding information of the new term under the target field of the segment in a case where there exists the old term but no the new term in the target field of the segment; and ending a process for the segment in a case where there exists no the old term in the target field of the segment.

According to an example, when generating the corresponding information of the new term under the target field of the segment according to the corresponding information of the old term under the target field of the segment, the machine executable instructions may also cause the processor to merge corresponding information of each of all old terms to be modified as the same new term.

According to an example, when generating the new index file of the segment based on the information under other fields of the segment, and the corresponding information of other terms and the corresponding information of the new term under the target field of the segment, the machine executable instructions may cause the processor to execute the following operations:

creating a memory space for the new index file to be generated and write a file header for the new index file according to a fixed format;

updating the new index file according to corresponding information of the other terms and corresponding information of the new term under the target field and information under the other fields, by traversing every field under the segment and traversing every term under every field in a lexicographic order; and writing an end-of-file for the new index file according to the fixed format, after processing all terms under all fields of the segment.

Further, when updating the new index file according to corresponding information of other terms and corresponding information of the new term under the target field and the information under the other fields, the machine executable instructions may cause the processor to execute the following operations:

in a case where a currently processed field is not the target field, writing corresponding information of all terms under the field in the new index file;

in a case where the field is the target field and a currently processed term under the field is the old term, ending a process for the term;

in a case where the field is the target field but the currently processed term is not the old term and precedes the new term in lexicographic order, writing corresponding information of the currently processed term in the new index file; and in a case where the field is the target field but the currently processed term is not the old term and follows the new term in the lexicographic order, confirming location information of the new term and after writing corresponding information of the new term in the new index file, writing corresponding information of the currently processed term in the new index file.

Further, the machine executable instructions may also cause the processor to sort all new terms under the same target field in the lexicographic order before traversing every field under the segment.

According to an example, the machine executable instructions may also cause the processor to execute the following operations:

acquiring information of all segments under the index folder and modifying a mergence strategy based on the acquired information to disable the segment associated with the acquired information to participate in the mergence, before traversing every segment in the index folder; and remodifying the mergence strategy based on the acquired information to enable the segment associated with the acquired information to participate in the mergence, after replacing a corresponding original index file in the index folder with the new index file.

The above embodiments are only used for illustrating but not for limiting the technical solution of the present disclosure, and those skilled in the art may make various modifications and variations without departing from the spirit and essence of the present disclosure. However, these corresponding modifications and variations are all within the protection scope of the claims attached herein.

The invention claimed is:

1. A method for modifying a Lucene index file, comprising:

acquiring a target field to be modified, an old term to be modified under the target field and a new term for replacing the old term;

by traversing every segment in an index folder,
generating corresponding information of the new term under the target field of the segment according to corresponding information of the old term under the target field of the segment, and
generating a new index file of the segment based on information under other fields of the segment, and corresponding information of other terms and corresponding information of the new term under the target field of the segment, wherein the other fields comprise all fields except the target field under the segment, the other terms comprise all terms except the new term and the old term under the target field, and the new index file comprises an inverted index file including term information in the Lucene index file; and replacing a corresponding original index file in the index folder with the new index file after processing all segments, wherein the generating the new index file of the segment based on the information under other fields of the segment, and the corresponding information of other terms and the corresponding information of the new term under the target field of the segment, comprises:

creating a memory space for the new index file to be generated, and writing a file header for the new index file according to a fixed format;

updating the new index file according to corresponding information of the other terms and corresponding information of the new term under the target field and information under the other fields, by traversing every field under the segment and traversing every term under every field in a lexicographic order; and writing an end-of-file for the new index file according to the fixed format, after processing all terms under all fields of the segment, wherein the updating the new index file according to corresponding information of the other terms and corresponding information of the new term under the target field and the information under the other fields, comprises:

in a case where a currently processed field is not the target field, writing corresponding information of all terms under the field in the new index file;

in a case where the field is the target field and a currently processed term under the field is the old term, ending a process for the term;

in a case where the field is the target field but the currently processed term is not the old term and precedes the new term in the lexicographic order, writing corresponding information of the currently processed term in the new index file; and in a case where the field is the target field but the currently processed term is not the old term and follows the new term in the lexicographic order, confirming location information of the new term and after writing corresponding information of the new term in the new index file, writing corresponding information of the currently processed term in the new index file.

2. The method according to claim 1, wherein the generating the corresponding information of the new term under the target field of the segment according to the corresponding information of the old term under the target field of the segment, comprises:

merging the corresponding information of the old term and the corresponding information of the new term under the target field of the segment and taking the merged information as the corresponding information of the new term under the target field of the segment, in a case where there exist both of the old term and the new term in the target field of the segment;

taking the corresponding information of the old term under the target field of the segment as the corresponding information of the new term under the target field of the segment, in a case where there exists the old term but no the new term in the target field of the segment; and ending a process for the segment in a case where there exists no the old term in the target field of the segment.

3. The method according to claim 2, wherein the generating the corresponding information of the new term under the target field of the segment according to the corresponding information of the old term under the target field of the segment, further comprises:

merging corresponding information of each of all old terms to be modified as the same new term.

4. The method according to claim 1, further comprising:
sorting all new terms under the same target field in the lexicographic order before traversing every field under the segment.

5. The method according to claim 1, further comprising:
acquiring information of all segments under the index folder and modifying a mergence strategy based on the acquired information to disable the segment associated with the acquired information to participate in the mergence, before traversing every segment in the index folder; and remodifying the mergence strategy based on the acquired information to enable the segment associated with the acquired information to participate in the mergence, after replacing a corresponding original index file in the index folder with the new index file.

6. The method according to claim 1, wherein the corresponding information includes a document number and an occurrence frequency.

7. The method according to claim 1, wherein the inverted index file includes segment.tim, segment.tip, segment.doc and segment.pos.

8. A device for modifying a Lucene index file, comprising a processor and a machine readable storage medium which stores machine executable instructions corresponding to a control logic for modifying the Lucene index file, wherein by executing the machine executable instructions, the processor is caused to:

acquire a target field to be modified, an old term to be modified under the target field and a new term for replacing the old term;

by traversing every segment in an index folder,
generate corresponding information of the new term under the target field of the segment according to corresponding information of the old term under the target field of the segment, and generate a new index file of the segment based on information under other fields of the segment, and corresponding information of other terms and corresponding information of the new term under the target field of the segment, wherein the other fields comprise all fields except the target field under the segment, the other terms comprise all terms except the new term and the old term under the target field, and the new index file comprises an inverted index file including term information in the Lucene index file; and replace a corresponding original index file in the index folder with the new index file after processing all segments, wherein when generating the new index file of the segment based on the information under other fields of the segment, and the corresponding information of other terms and the corresponding information of the new term under the target field of the segment, the machine executable instructions cause the processor to:
create a memory space for the new index file to be generated, and write a file header for the new index file according to a fixed format;
update the new index file according to corresponding information of other terms and corresponding information of the new term under the target field and the information under other fields, by traversing every field under the segment and every term under each field in a lexicographic order; and
write an end-of-file for the new index file according to the fixed format, after processing all terms under all fields of the segment,
wherein when updating the new index file according corresponding information of other terms and corresponding information of the new term under the target field and the information under other fields, the machine executable instructions cause the processor to:
in a case where a currently processed field is not the target field, write corresponding information of all terms under the field in the new index file;
in a case where the field is the target field and a currently processed term under the field is the old term, end a process for the term;
in a case where the field is the target field but the currently processed term is not the old term and precedes the new term in the lexicographic order, write corresponding information of the currently processed term in the new index file; and
in a case where the field is the target field but the currently processed term is not the old term and follows the new term in the lexicographic order, confirm location information of the new term and after writing corresponding information of the new term in the new index, write corresponding information of the currently processed term in the new index file.

9. The device according to claim 8, wherein when generating the corresponding information of the new term under the target field of the segment according to the corresponding information of the old term under the target field of the segment, the machine executable instructions cause the processor to:
merge the corresponding information of the old term and the corresponding information of the new term under the target field of the segment and take the merged information as the corresponding information of the new term under the target field of the segment, in a case where there exist both of the old term and the new term in the target field of the segment;
take the corresponding information of the old term under the target field of the segment as the corresponding information of the new term under the target field of the segment, in a case where there exists the old term but no the new term in the target field of the segment; and
end a process for the segment in a case where there exists no the old term in the target field of the segment.

10. The device according to claim 9, wherein the machine executable instructions further cause the processor to:
acquire information of all segments under the index folder and modify a mergence strategy based on the acquired information to disable the segment associated with the acquired information to participate in the mergence, before traversing every segment in the index folder; and
remodify the mergence strategy based on the acquired information to enable the segment associated with the acquired information to participate in the mergence, after replacing a corresponding original index file in the index folder with the new index file.

11. The device according to claim 8,
wherein the inverted index file includes segment.tim, segment.tip, segment.doc and segment.pos; and
wherein the corresponding information includes a document number and an occurrence frequency.

* * * * *